United States Patent [19]
DiSanto et al.

[11] Patent Number: 5,250,938
[45] Date of Patent: Oct. 5, 1993

[54] ELECTROPHORETIC DISPLAY PANEL HAVING ENHANCED OPERATION

[75] Inventors: Frank J. DiSanto, North Hills; Denis A. Krusos, Lloyd Harbor, both of N.Y.

[73] Assignee: Copytele, Inc., Huntington Station, N.Y.

[21] Appl. No.: 960,572

[22] Filed: Oct. 13, 1992

Related U.S. Application Data

[63] Continuation of Ser. No. 630,238, Dec. 19, 1990, abandoned.

[51] Int. Cl.$^5$ .............................................. G09G 3/34
[52] U.S. Cl. ...................................... 345/107; 345/55
[58] Field of Search ............... 340/787, 788, 792, 718, 340/719, 784, 815.2, 783; 359/54, 87, 62

[56] References Cited

U.S. PATENT DOCUMENTS

| | | | |
|---|---|---|---|
| 3,303,488 | 2/1967 | Anderson | 340/787 |
| 4,742,345 | 5/1988 | DiSanto et al. | 340/787 |
| 4,840,459 | 6/1989 | Strong | 340/784 |
| 5,034,736 | 7/1991 | Bennett et al. | 340/719 |

Primary Examiner—Alvin E. Oberly
Assistant Examiner—Chanh Nguyen
Attorney, Agent, or Firm—Arthur L. Plevy

[57] ABSTRACT

A triode-type electrophoretic display includes a glass viewing window upon which has been deposited a plurality of parallel cathode members. A plurality of grid members are deposited upon a layer of insulation above the cathode members and perpendicular thereto. A fluid-tight envelope encapsulating the cathode and grid members is formed by a glass cap having an conductor layer deposited on an interior surface for forming an anode. The glass cap seals against the viewing window. An electrophoretic fluid having pigmented particles suspended therein is contained in the envelope. The cathode and grid members have no free terminal ends within the fluid, instead, such ends extend beyond the fluid containing space and are covered by the cap. The cathode, grid and anode are selectively electrically chargeable to induce movement of the particles within the fluid, localized concentrations of particles at the intersections of the cathode and grid being visible through the viewing window.

12 Claims, 2 Drawing Sheets

ELECTROPHORETIC DISPLAY PANEL HAVING ENHANCED OPERATION

This is a continuation of application Ser. No. 07/630,238 filed Dec. 19, 1990, now abandoned.

FIELD OF THE INVENTION

The present invention relates to an electrophoretic display panel, and more particularly to an electrophoretic display panel having enhanced clarity and uniformity along the periphery of the display.

DESCRIPTION OF THE PRIOR ART

Electrophoretic display panels are well known. Each operates upon the same basic principle, viz., if a suspension of electrically charged pigment particles in a dielectric fluid is subjected to an applied electrostatic field, the pigment particles will migrate through the fluid in response to the electrostatic field. Given a substantially homogeneous suspension of particles having a pigment color different from that of the dielectric fluid, if the applied electrostatic field is localized it will cause a a visually observable localized pigment particle migration. The localized pigment particle migration results either in a localized area of concentration or rarefaction of particles depending upon the sign and direction of the electrostatic force and the charge on the pigment particles. The foregoing principles have been utilized in a variety of electrophoretic display designs. An example of an electrophoretic display apparatus is shown in U.S. Pat. No. 4,742,345 to DiSanto and Krusos, the inventors herein, entitled ELECTROPHORETIC DISPLAY PANEL APPARATUS AND METHODS THEREFOR, issued May 3, 1988. The device described in the foregoing patent is a triode type display having a plurality of independent, parallel cathode conductor members deposited in the horizontal on one surface of a glass viewing screen. A layer of insulating photoresist material deposited over the cathode members and photoetched down to the cathode members to yield a plurality of insulator strips positioned at right angles to the cathode members, forms the substrate for a plurality of independent, parallel grid conductor members running in the vertical direction. A glass cap member forms a fluid-tight seal with the viewing window along the cap's peripheral edge for containing the fluid suspension and also acts as a substrate for the anode which is a conductive layer deposited on the interior flat surface of the cap. When the cap is in place, the anode surface is in spaced parallel relation to both the cathode members and the grid members. Given a specific particulate suspension, the sign of the electrostatic charge which will attract and repel the pigment particles will be known. The cathode member voltage and the grid member voltage can then be ascertained such that when a particular voltage is applied to a cathode member and another voltage is applied to a grid member, the area proximate their intersection will assume a net charge sufficient to attract or repel pigment particles in suspension in the dielectric fluid. Since numerous cathode and grid lines are employed, there are numerous discrete intersection points which can be controlled by varying the voltage on the cathode and grid members to cause localized visible regions of pigment concentration and rarefaction. Essentially then, the operating voltages on both cathode and grid must be able to assume at least two states corresponding to a logical one and a logical zero. Typically, the cathode and grid voltages are selected such that only when both are a logical one at a particular intersection point, will a sufficient electrostatic field be present at the intersection to cause the writing of a visual bit of information on the display. The bit may be erased upon a zero-zero state occurring at the intersection. In this manner, digitized data can be displayed on the electrophoretic display. The cathode and grid members of this known device each have a contact end which protrudes beyond the anode cap, enabling a drive source to be independently applied to each cathode and grid element. In known devices, the ends of the cathode and grid elements distal to the contact pads were positioned within the fluid-tight enclosure such that the ends were exposed to the enclosed fluid and the suspended particles. It has been observed, however, that under certain circumstances and operating conditions, certain detrimental effects were noted. One detrimental effect caused the pigment around the edges of the display to appear ragged and non-uniform providing a ragged and non-uniform appearance at these display locations and to decrease the longevity of operation. This appearance is thought to be due to the discontinuous concentration of the electrostatic field strength at the ends of the cathode and grid members. This discontinuity occurs within the fluid filled envelope of the display at the terminal ends of the cathode and grid members. It is therefore an object of the present invention to provide an electrophoretic display having peripheral edges with clear definition under varying operating conditions thus preventing the detrimental effects observed arising from discontinuities in the electrostatic fields created within the fluid filled envelope.

SUMMARY OF THE INVENTION

The problems and disadvantages associated with conventional electrophoretic displays are overcome by the present invention which includes a fluid-tight envelope having a portion thereof which is at least partially transparent and an electrophoretic fluid contained within the envelope. The fluid has pigmented particles suspended in it. A plurality of elongated conductor members pass through the envelope and the fluid with both ends of the conductor members extending from the envelope. The conductor members are selectively electrically chargeable to induce movement of the particles within the fluid, the movement of said particles being at least partially visible through the transparent portion of the envelope.

BRIEF DESCRIPTION OF THE FIGURES

For a better understanding of the present invention, reference is made to the following detailed description of an exemplary embodiment considered in conjunction with the accompanying drawings, in which.

DETAILED DESCRIPTION OF THE FIGURES

Figure 1:
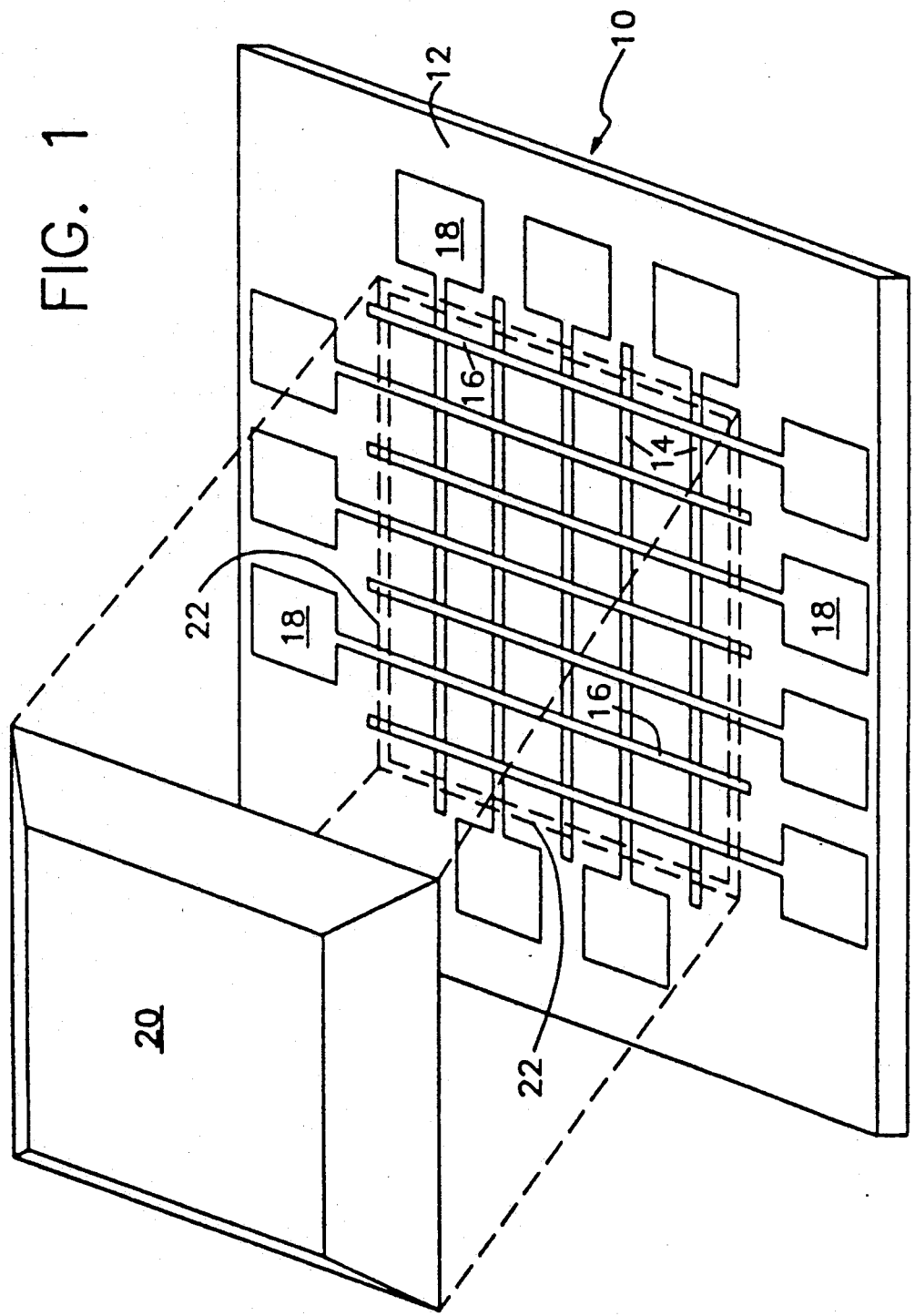
FIG. 1 is an exploded perspective rear view of a triode-type electrophoretic display panel in accordance with an exemplary embodiment of the present invention.

FIG. 1 shows the rear side of an electrophoretic display panel 10 in accordance with the present invention. The panel 10 includes a glass faceplate 12 upon which is deposited a plurality of independent, horizontal, electrically conductive cathode members 14 (rows) using conventional deposition and etching techniques. A plurality of vertically oriented grid conductors 16 (columns) are superimposed over the cathode members 14 and are insulated therefrom by an interstitial photoresist layer (not shown). Each cathode and grid conductor 14 and 16 terminates at one end in a contact pad 18 to permit the display 10 to be connected to display driver circuitry (not shown). An anode cap 20 is sealably affixed to the faceplate 12 and over the cathode and grid conductors 14 and 16 to form an envelope for containing the dielectric fluid/pigment particle suspension. The anode cap 20 is formed from an insulating material, such as glass, and has an inner surface coating of conductor material to form the anode plate of a triode. Thus, by applying voltages to the cathode and grid conductors 14 and 16 and the anode 20, suspended pigment particles in the dielectric fluid can be made to accumulate near, or disperse from, the intersections of selected cathode and grid conductors to translate these voltages into a visible display. These features are in accordance with U.S. Pat. No. 4,742,345 to DiSanto et al., entitled ELECTROPHORETIC DISPLAY PANEL APPARATUS AND METHODS THEREFOR, which patent is incorporated herein by reference to supply the details of assembly and function of the display 10. FIG. 1, however, does depict a feature of the present invention which is not shown in the prior art, viz., that the dimensions and positions of the cathode and grid conductors 14 and 16 are selected such that no terminal free end thereof is exposed to the dielectric fluid. This is accomplished by extending the ends of the cathode and grid conductors distal to the contact pads 18 such that they extend beyond the peripheral sealing edge of the anode cap 20. The location of the seal between the anode cap 20 and the faceplate 12 is depicted in dashed lines 22.

Figure 2:
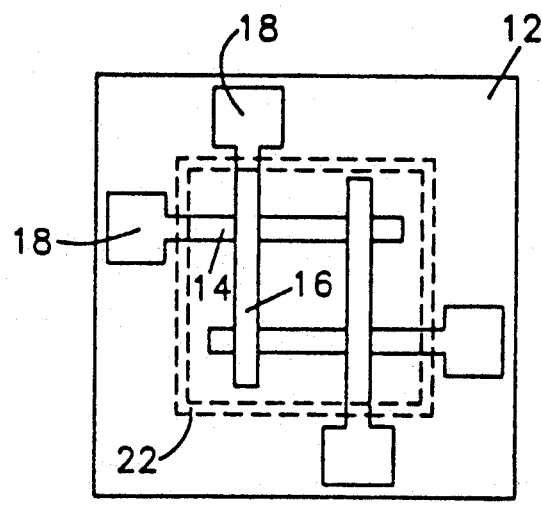
FIG. 2 is a diagrammatic depiction of the position of the grid and cathode members relative to the border of the anode cap utilized in prior art electrophoretic displays.
Figure 3:
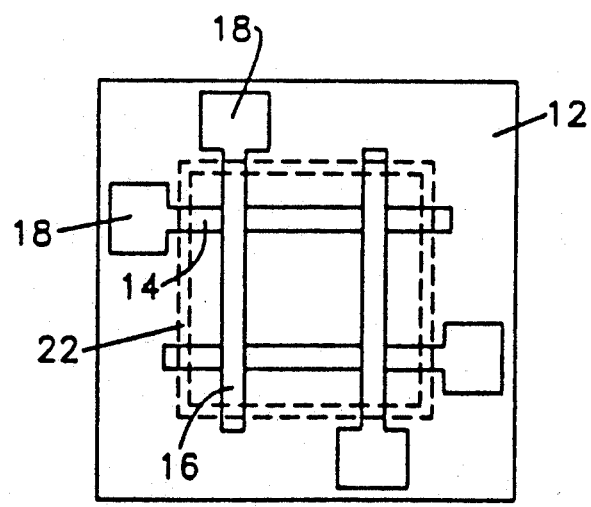
FIG. 3 is a diagrammatic depiction of the position of the grid and cathode members relative to the border of the anode cap utilized in the present invention.

The relative positions of the cathode and grid conductors 14 and 16 and the anode cap 20 of prior art devices and those of the present invention are shown diagrammatically in FIGS. 2 and 3. FIG. 2 illustrates the termination of cathode and grid conductors 14 and 16 within the anode seal 22 on the face plate 12 as was the practice in the prior art. This arrangement results in the observation of the detrimental effects noted earlier, under certain operating conditions and thus to provide a display having poor image quality around its periphery (the location of the terminal contained ends). In contrast, the present invention, as depicted in FIG. 3, includes cathode and grid conductors which extend beyond the fluid sealing periphery 22 of the anode cap 20 and therefore prevents exposing the dielectric fluid to the aforesaid electrostatic field discontinuities. This configuration provides a display with a consistent visual quality from edge to edge.

It should be understood that the embodiments described herein are merely exemplary and that a person skilled in the art may make many variations and modifications without departing from the spirit and scope of the invention as defined in the appended claims.

We claim:

1. An electrophoretic display comprising:

(a) a fluid-tight envelope having a portion thereof which is at least partially transparent;

(b) an electrophoretic fluid containing within said envelope, said fluid having pigmented particles suspended therein;

(c) a plurality of elongated substantially parallel cathode members having two ends and passing through said envelope and said fluid, said cathode members selectively electrically chargeable to induce movement of said particles within said fluid, said particles being at least partially visible through said transparent portion of said envelope, with at least some of said cathode members extending beyond said fluid contained in said envelope thereof whereby either of said two ends of said cathode members are located within said fluid preventing discontinuities in electrostatic field strength and corresponding detrimental effects upon said fluid at said ends when said display is operated.

2. The device of claim 1, wherein said cathode members are horizontally oriented and disposed within a first plane and further including a plurality of substantially parallel vertical grid members electrically insulated from said cathode members and disposed within a second plane, said first and said second planes being substantially parallel, said cathode members and said grid members forming a matrix with a plurality of intersections when viewed along a line perpendicular to said first and said second planes.

3. The device of claim 2, wherein each of said plurality of said cathode members and each of said plurality of said grid members have an end for electrically connecting to an associated voltage source and a free end, said connecting end and said free end both extending beyond said fluid contained within said envelope.

4. The device of claim 3, wherein said envelope includes a plate and a cap member having an end wall and side walls, said side walls defining a hollow within said cap member, said side walls sealably affixed to said plate to form said fluid tight envelope.

5. The device of claim 4, wherein said free end and said connecting end of said cathode members and said grid members both extend under said cap member where said cap member sealably affixes to said plate.

6. The device of claim 5, wherein said end wall of said cap within said hollow is coated with a conductor layer and is selectively charged by an applied voltage to induce movement of said pigment particles.

7. The device of claim 6, wherein said electrophoretic display is a triode-type device, said conductor coating on said end wall being the anode.

8. The device of claim 7, wherein said plate constitutes said transparent portion of said envelope.

9. The device of claim 8, wherein said plate is glass, said cathode members being deposited upon said plate, and said grid members are deposited upon an insulation layer interposed between said cathode members and said grid members.

10. The device of claim 9, wherein said cap member is glass and said conductor coating and said end wall are substantially parallel to said first and second planes.

11. The device of claim 10 further including a sealer interposed between said cap member and said plate for making a fluid tight seal.

12. The device of claim 11, wherein said connecting ends and said free ends of succeeding said horizontal members and succeeding said vertical members are positioned in proximity to one another.

* * * * *